United States Patent
Lioulis et al.

(10) Patent No.: US 9,706,558 B2
(45) Date of Patent: Jul. 11, 2017

(54) COORDINATION AND QOS SCHEDULING

(71) Applicant: Vodafone IP Licensing Limited, Newbury, Berkshire (GB)

(72) Inventors: Nikolaos Lioulis, Newbury (GB); Alan Law, Newbury (GB); Andrew Dunkin, Newbury (GB)

(73) Assignee: Vodafone IP Licensing Limited, Newbury, Berkshire (GB)

(*) Notice: Subject to any disclaimer, the term of this patent is extended or adjusted under 35 U.S.C. 154(b) by 174 days.

(21) Appl. No.: 14/026,891

(22) Filed: Sep. 13, 2013

(65) Prior Publication Data
US 2014/0073342 A1 Mar. 13, 2014

(30) Foreign Application Priority Data
Sep. 13, 2012 (GB) .................................. 1216393.7

(51) Int. Cl.
*H04W 72/08* (2009.01)
*H04W 64/00* (2009.01)
(Continued)

(52) U.S. Cl.
CPC ......... *H04W 72/082* (2013.01); *H04W 64/00* (2013.01); *H04W 72/048* (2013.01); *H04W 72/12* (2013.01)

(58) Field of Classification Search
CPC . H04W 72/082; H04W 72/048; H04W 72/12; H04W 64/00
See application file for complete search history.

(56) References Cited

U.S. PATENT DOCUMENTS

2005/0265300 A1  12/2005  Van Rensburg
2010/0067589 A1   3/2010  Schumacher et al.
(Continued)

FOREIGN PATENT DOCUMENTS

CN  101420760  4/2009
CN  102088726  6/2011
(Continued)

OTHER PUBLICATIONS

European Search Report for 13184312.0 dated Feb. 18, 2014.
(Continued)

*Primary Examiner* — Lester Kincaid
*Assistant Examiner* — William Wang
(74) *Attorney, Agent, or Firm* — Workman Nydegger

(57) ABSTRACT

A scheduler for a cellular telecommunications network is provided having a first base station corresponding to a first cell and serving a cell area, the scheduler being adapted to: identify mobile devices located at the edge of the cell area; obtain resource usage information of mobile devices located at the edge of neighboring cell areas; and, allocate resource blocks for data transmission based on the location of the mobile devices and the received resource usage information, wherein those data transmissions with a high priority indication and which are for mobile devices located at the edge of the cell area are allocated with a higher priority than those data transmissions with a high priority indication and which are for mobile devices not located at the edge of the cell area. An associated method and computer readable storage medium are also provided.

20 Claims, 3 Drawing Sheets

(51) Int. Cl.
*H04W 72/04* (2009.01)
*H04W 72/12* (2009.01)

(56) References Cited

U.S. PATENT DOCUMENTS

| | | |
|---|---|---|
| 2010/0069063 A1 | 3/2010 | Osterling et al. |
| 2010/0085904 A1 | 4/2010 | Hamaue |
| 2010/0151875 A1* | 6/2010 | Kim .................... H04W 72/082 455/452.2 |
| 2010/0214997 A1 | 8/2010 | Tao et al. |
| 2010/0220670 A1* | 9/2010 | Teo ........................ H04J 11/005 370/329 |
| 2011/0081865 A1* | 4/2011 | Xiao ................... H04W 52/243 455/63.1 |
| 2011/0134876 A1* | 6/2011 | Takada .............. H04W 72/0406 370/329 |
| 2011/0149879 A1* | 6/2011 | Noriega ............ H04W 72/1236 370/329 |
| 2011/0188481 A1 | 8/2011 | Damnjanovic et al. |
| 2011/0195724 A1 | 8/2011 | Lee et al. |
| 2011/0294514 A1* | 12/2011 | Kulkarni ........... H04W 72/0426 455/450 |
| 2011/0312281 A1 | 12/2011 | Xiao et al. |
| 2013/0258895 A1 | 10/2013 | Kim et al. |
| 2014/0073338 A1 | 3/2014 | Lioulis et al. |

FOREIGN PATENT DOCUMENTS

| | | |
|---|---|---|
| EP | 2211584 | 7/2010 |
| WO | WO 2008/050230 | 5/2008 |
| WO | WO 2012/037868 | 3/2012 |
| WO | WO2012/079757 | 6/2012 |
| WO | WO2012/080800 | 6/2012 |
| WO | WO 2012/155711 | 11/2012 |

OTHER PUBLICATIONS

GB1216393.7, Jan. 11, 2013, United Kingdom Combined Search and Examination Report.
U.S. Appl. No. 14/026,867, filed Sep. 13, 2013, Lioulis et al.
UK Combined Search and Examination and Search Report for GB1216392.9 dated Dec. 21, 2012.
UK Combined Search and Examination Report for GB1216392.9 dated Aug. 29, 2014.
EPO Search Report for 13184311.2 dated Feb. 18, 2014.
U.S. Appl. No. 14/026,867, filed Jul. 17, 2015, Office Action.
U.S. Appl. No. 14/026,867, filed Feb. 12, 2016, Final Office Action.
U.S. Appl. No. 14/026,867, filed Jul. 29, 2016, Office Action.
Final Office Action issued in U.S. Appl. No. 14/026,867 dated Mar. 3, 2017.

\* cited by examiner

COORDINATION AND QOS SCHEDULING

CROSS REFERENCE TO RELATED APPLICATIONS

This application claims priority to United Kingdom Number 1216393.7, filed on Sep. 13, 2012, the entirety of which is incorporated herein by reference.

BACKGROUND TO THE INVENTION

In cellular telecommunications networks, data communications between multiple mobile devices and the network are typically coordinated by a scheduler, which is conventionally comprised within the base station of the access portion of the network. Generally, each base station corresponds to a cell of the network and serves a geographical area. The term cell refers to a region in which radio signals from a specific base station antenna dominate. Each data transmission is divided into a set of data blocks, or resource blocks, which are transmitted in both the downlink (DL) and uplink (UL) directions, that is, from or to the base station. The scheduler assigns at which time these blocks are transmitted and assigns a 'resource' to be used for the transmission. A resource is a frequency of available spectrum which is to be used for that transmission. Hence a resource block is a time period of a particular frequency or set of frequencies which is to be used for transmission of a portion of the data.

In advanced telecommunications networks, Quality of Service (QoS) plays a key role in providing satisfactory service to users and in managing network functions. QoS is an indicator of the ability, or probability, of the network to provide a level of service for selected traffic on the network. Different service levels are specified for different types or streams of traffic. Typically, to provide QoS, the network identifies different types of streams of traffic and processes these traffic classes differently to achieve, or attempt to achieve, the desired service level for each traffic class.

In Long Term Evolution (LTE), for example, there are two types of traffic, those designated Guaranteed Bit Rate (GBR) and those designated non-Guaranteed Bit Rate (non-GBR). The GBR is the minimum reserved traffic rate the network guarantees. Those services designated as GBR services are allocated the highest priority and are allocated above all others when the base station allocated resource blocks for transmission.

Typically, cells of the network employ inter-cell interference coordination (ICIC) to assign resource blocks to the mobile devices. As part of this coordination, those cells serving adjacent or overlapping geographical areas, will share information with others to aid in serving those users who are situated at the edge of the geographical area covered by the cell, that is, those users which are likely to encounter interference from the use of resources by neighbouring cells. The available resource blocks are divided up between the two cells, such that the two cells assign sufficiently different resource blocks when serving users in proximity to each other. Thus, the risk of interference affecting transmissions for users in these locations is mitigated. ICIC is defined in various places in the 3GPP specifications, such as for example 3GPP TS36.423 which defines the interface between the cells.

FIG. 1 illustrates the two types of cell users. FIG. 1 illustrates two cells 10 and 11. Those users located in regions 12 and 13 can be classified as Cell Centre Users (CCUs) and those users located in regions 14 and 15 can be classified as Cell Edge Users (CEUs) as they are likely to suffer interference from the neighbouring cell.

When ICIC is implemented, the CEUs are restricted to a specific range of resource blocks. Cell edge users in neighbouring cells are restricted to different ranges in order to avoid conflict. Depending on the scheduling algorithm that has been used, this may result in CEUs which have been allocated a high priority being unable to be allocated resource blocks since the resource blocks available are restricted. Accordingly, when the network may be required to provide a certain QoS, the CEUs do not have the necessary resource blocks available to meet the guarantees required by that type of traffic.

Additionally, according to the conventional algorithms, once ICIC is implemented, the CEUs are allocated resource blocks within that specific range before any consideration is given to the rest of the users. In this way, when the network may be required to provide a certain QoS, the CCUs which have been assigned a high priority may not be allocated sufficient resources since the available resources have been allocated to the CEUs which may not have a high priority assigned.

The present invention seeks to overcome the above drawbacks with known resource block allocation using inter-cell interference coordination and QoS.

SUMMARY OF THE INVENTION

According to a first aspect of the present invention, there is provided a scheduler for a cellular telecommunications network having a first base station corresponding to a first cell and serving a cell area, the scheduler being adapted to: identify mobile devices located at the edge of the cell area; obtain resource usage information of mobile devices located at the edge of neighbouring cell areas; and, allocate resource blocks for data transmission based on the location of the mobile devices and the received resource usage information, wherein those data transmissions with a high priority indication and which are for mobile devices located at the edge of the cell area are allocated with a higher priority than those data transmissions with a high priority indication and which are for mobile devices not located at the edge of the cell area.

The scheduler thus takes into account of both the Quality of Service of the transmission and also the location of the user within the cell. By prioritising those mobile devices located at the edge of the cell over those mobile devices located at the centre of the cell, the scheduler ensures that there are available resource blocks to guarantee quality of service and prevents mobile devices who do not have a restricted available allocation from being allocated resource blocks before mobile devices which have only a specific range available as a consequence of inter-cell coordination between neighbouring cells.

Those data transmissions with a high priority indication and which are for mobile devices not located at the edge of the cell area may be allocated with a higher priority than those data transmissions without a high priority indication and which are for mobile devices located at the edge of the cell area. In this way, resource blocks are not wasted by those devices located at the edge of the cell area using resource blocks that could be used to transmit high priority data transmissions.

Those data transmissions without a high priority indication and which are for mobile devices located at the edge of the cell area may be allocated with a higher priority than those data transmissions without a high priority indication and which are for mobile devices not located at the edge of the cell area. In this way, the quality of service priorities are maintained The high priority indication may be a guaranteed bit rate, GBR. The resource blocks may be allocated using enhanced proportional fair scheduling. The resource usage information may comprise a High Interference Indicator and an Overload Indicator in the uplink direction and a Relative Narrowband Transmit Power in the downlink direction.

According to a second aspect of the present invention, there is provided a method in a cellular telecommunications network for allocating resource blocks for data transmission to or from mobile devices connected to a first base station, the first base station corresponding to a first cell and serving a cell area, the method comprising: identifying mobile devices located at the edge of the cell area; obtaining resource usage information of mobile devices located at the edge of neighbouring cell areas; and, allocating resource blocks for data transmission based on the location of the mobile devices and the received resource usage information, wherein those data transmissions with a high priority indication and which are for mobile devices located at the edge of the cell area are allocated with a higher priority than those data transmissions with a high priority indication and which are for mobile devices not located at the edge of the cell area.

BRIEF DESCRIPTION OF THE DRAWINGS

An example of the present invention will now be described in detail with reference to the accompanying drawings, in which.

GLOSSARY

Figure 1:
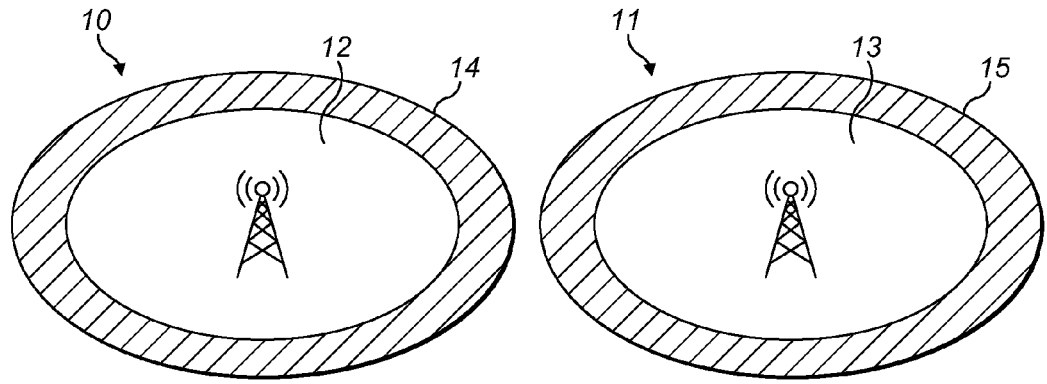
FIG. 1 shows a schematic illustration of an overview of cell edge and cell centre users.

3GPP Third Generation Partnership
CEU Cell Edge User
CP Cyclic Prefix
CQI Channel Quality Indicator
eNB evolved-Node B
FDD Frequency Division Duplex
GSM Global System for Mobile Communications
HII High Interference Indicator
HSDPA High Speed Downlink Packet Access
ICIC Inter-cell Interference Coordination
LTE Long Term Evolution
MCS Modulation and Coding Scheme
MS Mobile Station
OI Overload Indicator
PC Personal Computer
PDN-GW Packet Data Network Gateway
PRB Physical Resource Block
RB Resource Block
RNTP Relative Narrowband Transmit Power
SDF Service Data Flow
TDD Time Division Duplex
TD-SCDMA Time Division-Synchronous Code Division Multiple Access
UE User Equipment
UMTS Universal Mobile Telecommunications System
WIMAX Worldwide Interoperability for Microwave Access

DETAILED DESCRIPTION

In the following description, reference will be made to Global System for Mobile Communications (GSM), Universal Mobile Telecommunications System (UMTS), Long Term Evolution (LTE) and to particular standards. However it should be understood that the present disclosure is not intended to be limited to these. The present invention may also be applicable to a number of modes of transmission such as Time Division Duplex (TDD), Frequency Division Duplex (FDD), Time Division-Synchronous Code Division Multiple Access (TD-SCDMA), and High Speed Downlink Packet Access (HSDPA), among others.

While devices are often referred to as "mobile" in the description herein, the term "mobile" should not be construed to require that a device always be mobile, merely that it has the capability of being in communication with a wireless telecommunications network which allows mobility. For instance, a PC terminal or a machine to machine client that is never moved from a particular geographic location may in a sense still be considered mobile as it could be moved to a different location yet still access the same network. Where the term "mobile device" is used in the present discussion it is to be read as including the possibility of a device that is "semi-permanent" or even "fixed" where the context does not contradict such an interpretation.

Although throughout the following description the present invention is described in the context of an LTE network, it will be understood that the principles are equally applicable to other wireless data telecommunications networks such as GSM, UMTS, WIMAX, cdmaOne and its variants. Each specification and standard may define equivalent terms to those used herein such as Channel Quality Index (CQI) and Reference Signal Received Power (RSRP). For convenience, only the LTE specific terms are used throughout.

In a typical cellular radio telecommunications network, a wireless telecommunications device communicates via one or more radio access networks (RAN) to one or more core networks. The RAN includes a plurality of base stations (BS), each base station (BS) corresponding to a respective cell of the telecommunications network. The term cell refers to a region in which radio signals from a specific base station antenna dominate. The mobile devices may be handheld mobile telephones, personal digital assistants (PDAs), smartphones, tablet computers or laptop computers equipped with a data card among others. In a UMTS or LTE system, such devices are typically referred to as User Equipment (UE). In a GSM system, such devices are typically referred to as Mobile Stations (MS). In the description herein both terms may be used interchangeably; however it will be noted that the term UE will be used predominantly.

LTE (Long Term Evolution) is a next generation network technology created by the 3rd Generation Partnership Project (3GPP). It has been designed to deliver high data throughput to mobile users. In LTE, a scheduler is situated at the base station, i.e. the evolved-Node B (eNB), and is responsible for allocating transmission slots in the downlink (DL) and uplink (UL) directions to and from UEs. Throughout the description, the terms base station and eNB may be used interchangeably.

LTE uses orthogonal frequency division multiple access (OFDMA) for the downlink and single carrier frequency division multiple access (SC-FDMA) for the uplink. OFDMA is a multi-carrier scheme that allocates radio resources to multiple users. OFDMA uses orthogonal frequency division multiplexing (OFDM) which splits the carrier frequency bandwidth into many small sub-carriers spaced at 15 kHz, and then modulates each individual sub-carrier using a digital modulation format. OFDMA assigns each user with the bandwidth needed for their transmission. Unassigned subcarriers are switched off, thus reducing power consumption and interference. Although OFDMA uses OFDM, multiple users are allowed to share the same bandwidth at each point in time. In SC-FDMA, data spreads across multiple sub-carriers, unlike OFDMA where each sub-carrier transports unique data.

One feature shared by LTE in both the DL and the UL is the generic frame structure, where transmissions are segmented into frames. The LTE specification defines both FDD and TDD modes of operation. LTE frames are typically 10 ms in duration. Generally, frames consist of 20 slot periods of 0.5 ms. Sub-frames contain two slot periods and are 1 ms in duration. For transmission, users are allocated a specific number of sub-carriers for a pre-determined amount of time. These are referred to as physical resource blocks (PRBs) in the LTE specifications but may also be generally referred to as resource blocks (RBs). PRBs thus have both a time and frequency dimension.

The smallest modulation structure of LTE is a resource element. In FDD mode, a resource element is one 15 kHz sub-carrier and one symbol. Resource elements aggregate into resource blocks. A resource block has dimensions of sub-carriers and symbols. 12 consecutive sub-carriers in the frequency domain and 6 or 7 symbols in the time domain form each resource block. The number of symbols depends on the cyclic prefix (CP) in use. When a normal CP is used, the resource block contains seven symbols. When an extended CP is used, the resource block contains six symbols since the CP will take up more space in the frame. A delay spread that exceeds the normal CP link indicates the use of extended CP.

The allocation of resource blocks is handled by a scheduling function at the base station. A resource block is the smallest element of resource allocation assigned by the base station scheduler. As stated above, the 10 ms frame of LTE is divided into 10 sub-frames. Each sub-frame divides into two slots of 0.5 ms. In the time domain, a slot is exactly one resource block long.

Figure 2:
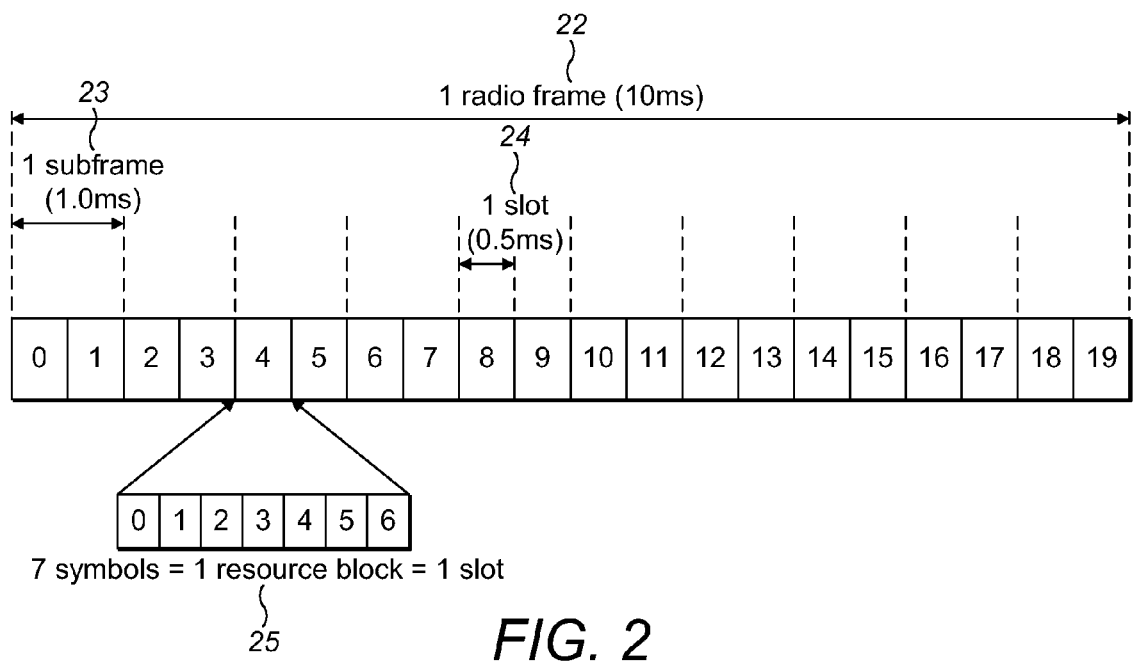
FIG. 2 shows a Frequency Division Duplex (FDD) radio frame.

FIG. 2 illustrates an exemplary FDD frame type 22. As shown, the frame 22 is made up of a series of sub-frames 23, each sub-frame comprising two time slots 24. Each time slot 24 is equivalent to a resource block 25.

Figure 3:
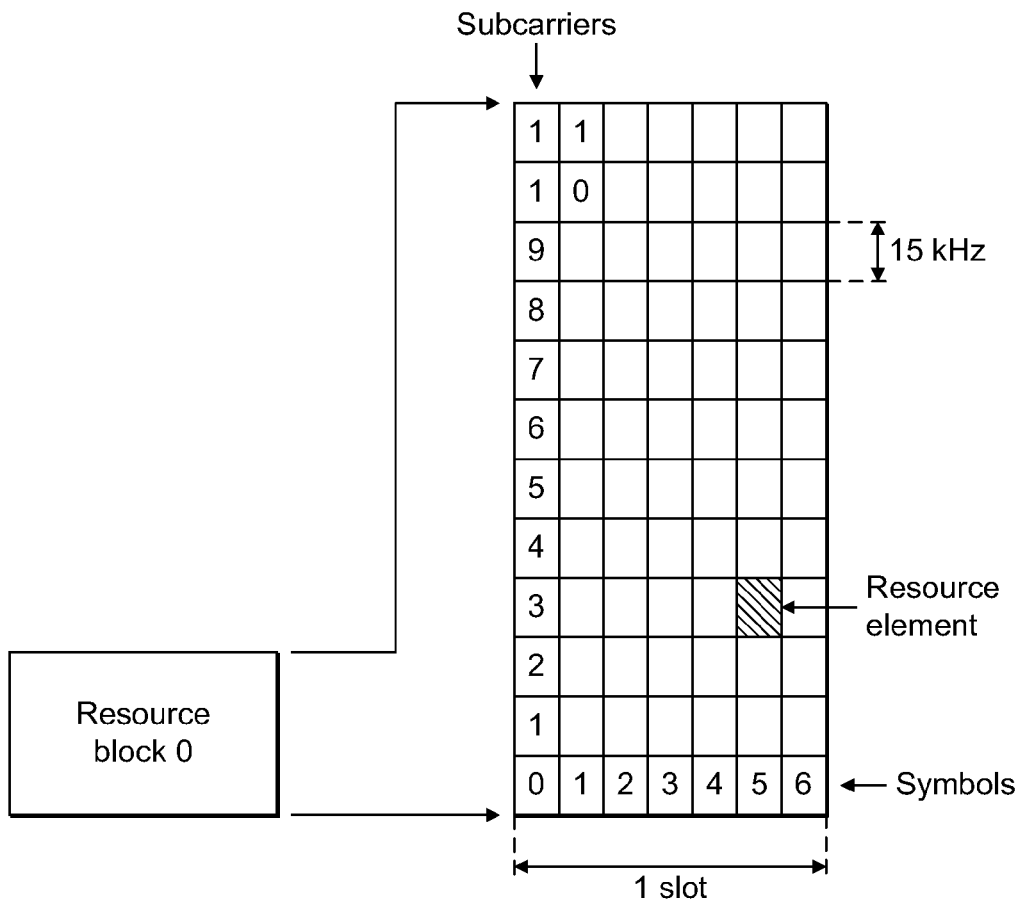
FIG. 3 shows a resource grid.

FIG. 3 illustrates the relationship between a slot, symbols and resource blocks in the form of a resource grid. As shown, each resource block is made up of a set number of sub-carriers and symbols. A specific symbol and sub-carrier defines a resource element.

For the purposes of transmission, there are a limited number of resource blocks available which correspond to the amount of available bandwidth. In the DL direction, the number of available resource blocks is determined by the total available bandwidth, the bandwidth of each sub-carrier and, the total bandwidth of each resource block. For example, if the total available bandwidth is 20 MHz, the sub-carrier bandwidth is 15 kHz and there are 12 sub-carriers for each resource block giving a total resource block bandwidth of 180 kHz; then the number of available resource blocks is 100. The LTE specification for the number of available PRBs for 1.25 MHz to 20 MHz is shown in the table below.

| Bandwidth (MHz) | 1.25 | 2.5 | 5.0 | 10 | 15.0 | 20.0 |
|---|---|---|---|---|---|---|
| Subcarrier bandwidth (kHz) | | | 15 | | | |
| PRB bandwidth (kHz) | | | 180 | | | |
| No. of available PRBs | 6 | 12 | 25 | 50 | 75 | 100 |

In LTE, the scheduler of the eNB assigns the available bandwidth in terms of resource blocks for data transmission to each UE. The aim of the scheduler is to make best use of the available resources and to increase the transmission rates. As stated in the background section above, UEs positioned at the edge of a cell area will encounter interference from transmissions in neighbouring or overlapping cells. Interference is caused by a neighbouring cell using the same allocated resource at the same time as the UE is scheduled to transmit or receive in the serving cell. This problem can be summarised as: users that are from another part of the network, i.e. connected to a different cell than the cell in question, may cause interference with the UE if they are using the same or similar resource blocks at the time of transmission.

The 3GPP have designed Specifications for Inter-cell Interference Coordination (ICIC) as a means for reducing inter-cell interference and improving throughput at cell edges. To provide for inter-cell coordination, the 3GPP standards body has defined the X2 interface. The X2 interface is an inter-base-station interface that enables adjacent base stations to exchange information on bands and sub-bands generating large interference in other cells and on bands or sub-bands that are affected by large interference from other cells.

For ICIC it is defined in the standards that there are a set of interference coordination signals that can be used for implementing ICIC in both the downlink and uplink directions. The signals include relative narrowband transmit power (RNTP), high interference indicator (HII) and interference overload indicator (OI).

In the downlink direction, the RNTP message is used. RNTP is signalled using a bitmap where each RNTP bit value indicates whether the corresponding resource block pair is limited by a transmit power threshold or not. Upon receipt of the RNTP message, the recipient eNBs can take into account this information while determining their scheduling decision for subsequent subframes. For example, the recipient eNB may avoid scheduling UEs in resource blocks where the source eNB is transmitting above a certain power limit. The RNTP signals take the value of zero or one and are sent to multiple base stations serving adjacent cells for each resource block. As described above, a resource block is a unit of allocation in the frequency domain having a specific bandwidth. Specifically, the RNTP value is set to zero if the ratio between the transmit power of the DL signal allocated to the resource block and the average transmit power of the system frequency band is guaranteed to be under a certain threshold and is otherwise set to one. The base station thus learns about a resource block that may be transmitting at high power in an adjacent cell and therefore reduces interference by avoiding allocating that resource block to a user experiencing poor reception.

In the uplink direction, HII and OI are used. HII is used by a base station to notify to multiple base stations serving adjacent cells of the uplink RB that it has allocated to a cell-edge user. The HII is proactive indicator sent as a bitmap with one bit per resource block that the serving cell intends to use for scheduling cell-edge UEs potentially causing high inter-cell interference. This enables cell-edge users in adjacent cells to be allocated different bands. This is similar to the downlink approach, which means that improved throughput can be expected for these cell-edge users.

The OI signal is used by a base station to notify multiple base stations serving adjacent cells of the results of measuring interference power for each resource block and classifying those results into multiple levels. The OI is a reactive indicator exchanged over the X2 interface reflecting the uplink interference plus noise level of a resource block measured by an eNB. The base station of a cell that receives notification of high interference power from an adjacent cell can reduce the transmit power of its user and thereby reduce the amount of interference created in the adjacent cell.

Based on the above resource usage information received on the resource blocks that will be used by the cell-edge users, that is the UEs positioned at the edge of the serving cell, the eNB is operable to decide how to allocate the resource blocks to its cell edge users as well as to the other users of the cell.

In order to identify those users positioned at the edge of the cell, the UE typically uses two indicators. These are the CQI sent by the device to the base station and an indication of the path loss of data transmissions. The base station assumes that those UEs with high path loss and a low CQI, and therefore have a low channel quality, are positioned at the edge of the cell. The base station does not care or indeed know, the exact location of the UE within the cell merely that it is likely to be a cell edge user because the channel quality is low and it is suffering from a high amount of interference.

The CQI is a report which has been sent from the device and indicates the state of the radio channel. The CQI is a recommendation from the device about which modulation and coding scheme (MCS) a scheduler should allocate to that device, based on the latter's estimate of current radio conditions. Device CQI reports can be wideband, in which case the value represents a value of the radio conditions over all sub-bands, or they can be narrow band; that is, specific to a particular sub-band. Examples of the CQI reports sent by the devices are outlined in 3GPP TS 36.213 specification v 9.3.0. The CQI corresponds to the signal to interference plus noise ratio (SINR).

Each eNB transmits detectable symbols, known as reference signals, with a known transmission and power. The received power on these reference signals is a standard measurement made by the UE, known as the reference signal received power (RSRP). The RSRP is signalled to the affiliated eNB. The RSRP signals can be used to estimate path loss and hence the distance of the UE from each cell. The eNB can then determine that the UE is likely to be at the edge of the cell and can therefore be classified as a cell edge user.

Once the base station has determined a list of cell edge users, it can then use this information, together with the resource usage information received from the adjacent cells, that is the HII, OI and RNTP, in order to allocate resource blocks to the cell edge users.

Quality of service (QoS) is a key part of modern telecommunications networks and plays a key role in the delivery of modem data services. QoS aids in providing satisfactory service delivery to users and in managing network functionality. QoS refers to the ability (or probability) of the network to provide a desired level of service for selected traffic on the network. QoS is described here in the context of LTE, however, it should be clear that QoS principles exist in other telecommunications systems, for example, UMTS. 3GPP TS 23.401 "GPRS Enhancements for E-UTRAN Access" describes in detail the overall QoS concept and the concept of bearer level QoS. In LTE, QoS has a signal 'bearer' level of granularity. A bearer uniquely identifies traffic flows that receive a common QoS treatment and can be defined as a packet flow established between a packet data network gateway, that is the server part of the network, and the UE. All traffic mapped to the same bearer will receive the same bearer level packet forwarding treatment (e.g. scheduling policy, queue management policy, rate shaping policy, Radio Link Control (RLC) configuration, etc.). A bearer in LTE is able to support the transmission of one or more service data flows (SDFs) and Multiple SDFs can multiplex the same bearer provided they have the same level of QoS.

LTE defines a default bearer that always exists in the lifetime of the connection service in order to provide the UE with always on IP connections. The default bearer in LTE is similar to the initial service flow in WIMAX and is used to establish IP connectivity. Other bearers, that is, not the default bearer, in connection with the same packet data network, are called dedicated bearers and the set up or modification of these dedicated bearers can be triggered by the network side only.

The bearer level QoS parameters in LTE include: quality class identifier (QCI); allocation and retention priority (ARP); guaranteed bit rate (GBR); maximum bit rate (MBR); and, aggregated maximum bit rate (AMBR). Each bearer is assigned a scalar value which is referred to as the QCI, which specifies the class to which the bearer belongs. Each bearer also contains an ARP which is used to determine whether to accept or reject a request to establish or modify the bearers in case of limited resources, and which bearer needs to be discarded in case of special resource limit After a bearer is successfully established, the ARP should not have any effect of the bearer level packet transfer and processing.

In addition to the QCI and ARP, each bearer may be identified as a GBR or non-GBR bearer. The default bearer must be a non-GBR bearer. Each GBR bearer is also associated with GBR and MBR. GBR bearers are mainly used to carry voice, video and real-time gaming services through dedicated bearers or static scheduling. The GBR value represents the bit rate that can be expected to be provided by a GBR bearer, while the MBR indicates the upper limit of GBR bearer. Non-GBR bearers are mainly used to carry signalling and other data services such as email.

LTE introduces the concept of aggregated bearers and the AMBR is the total amount bit rate of a group of non-GBR bearers. Each non-GBR bearer can potentially make use of the whole AMBR if other bearers are not transferring services. The AMBR therefore restricts the total bit rate of all bearers sharing this AMBR.

Whilst the above is being described in a concept of LTE, similar QoS parameters are defined in other network standards such as UMTS and WIMAX. The present invention is not limited to LTE but the LTE implementation is merely given for exemplary purposes. The concept of a transmission bearer is also not limited to LTE. UMTS data transmissions may also have the concept of GBR and non-GBR whereby the data network is able to prioritise certain communications.

We have so far introduced the concept that a specific data transmission may be allocated a high priority, that is as a GBR transmission, or allocated a low priority, that is as a non-GBR data transmission. We have also introduced how neighbouring cells may communicate with each other in order to reduce interference at the cell edge. The relationship between QoS and cell coordination will now be described.

Typically, when inter-cell interference coordination is implemented, then specific resource blocks are allocated for the cell edge users. The cell edge users are restricted to this range. If there are resource blocks available within this range, once the cell edge users have been allocated their resources, then those available resource blocks within this range may be allocated to centre cell users.

Figure 4:
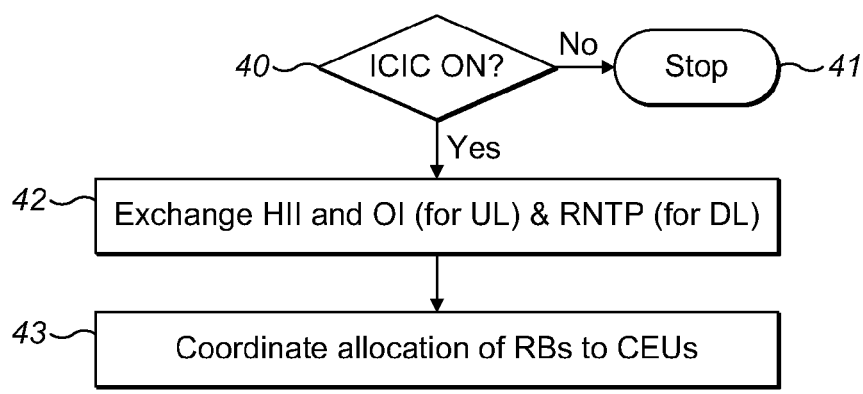
FIG. 4 shows a flow diagram of an inter-cell interference coordination.

In the known manner and as shown in FIG. 4, if a scheduler has been configured to use inter-cell interference coordination, at step 40, the scheduler will exchange HII and OI values for uplink and RNTP values for downlink with neighbouring base stations, at step 42. If the scheduler has not been configured for inter-cell inter-coordination, at step 40, then the rest of the process will not be performed and the process stops, at step 41. Once the resource usage information has been exchanged, at step 42, the scheduler will coordinate the allocation of resource blocks to the cell edge users with the adjacent base stations, at step 43.

If the scheduler has GBR data transmissions to allocate then it will try and cover these needs because they have been assigned a higher priority. Typically, enhanced proportional fair scheduling is used to allocate the resource blocks. Enhanced proportional fair scheduling is a scheduling algorithm common to various telecommunications standards and 3GPP protocols.

The needs of the GBR transmissions are met without taking into account how the users are distributed within the cell. If there are GBR users in both the cell edge and cell centre areas, then the GBR cell centre users will not have priority over the cell edge users since these users are allocated resources within their specific range. This may cause non-GBR cell edge users to be allocated resources in preference to GBR cell centre users and thus the required QoS is not met. Further, if there are a large number of GBR cell edge users and a small number of GBR cell centre users, the needs of the GBR cell edge users may not be met because they are restricted to a specific range. The cell edge users may not be able to offer the promised bit rate because the scheduler does not have enough resource blocks available. In summary, the current prioritisation method only considers whether or not the user is GBR and there is no differentiation for the location of the users in the cell.

An example of the present invention will now be described, in which prioritisation is based both on the GBR assigned to the data transmission and the location of the user.

In the known manner and as shown in FIG. 4, if ICIC is not configured, at step 40, then the process will stop, at step 41. If ICIC is configured, at step 40, then in the conventional manner, the scheduler will exchange resource usage information such as the HII and OI for uplink and the RNTP for downlink, at step 42. Having exchanged this information, the scheduler will coordinate the allocation of resource blocks to the cell users, at step 43. If GBR data transmissions are present, then these will be given priority and enhanced proportional fair scheduling may be used. In the known manner, all GBR users have priority over the non-GBR users since it is required that the network guarantees their throughput.

However, according to the present invention, those users positioned at the edge of the cell, i.e. the CEUs, will have priority over the rest of the users. Preferably, if resource blocks are left in the region allocated to the cell edge users, then these may be assigned for other GBR users in preference to users positioned at the edge of the cell who may not have GBR assigned for data transmissions. Once the GBR users have been satisfied and their data transmissions have been allocated, then the scheduler may move to the non-GBR users and follow the normal scheduling procedure that has been chosen by the network operator.

In a further example, once the GBR users have been allocated resource blocks for their data transmission, the cell edge users of the non-GBR data transmissions, may be given priority over the centre cell users, since here there are a limited number of available resource blocks as a result of the inter-cell interference coordination allocation.

Figure 5:
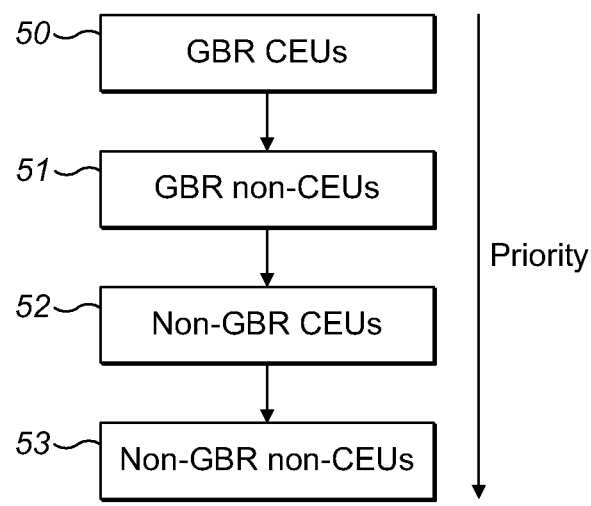
FIG. 5 shows the priorities in accordance with an example of the present invention; and, FIG. 6 shows a schematic illustration of a common scheduler.

The preferred order of preference is illustrated in FIG. 5. As shown, the GBR data transmissions for cell edge users are assigned the mode the highest priority, indicated as step 50. Those GBR data transmissions for non cell edge users are then allocated, indicated as step 51. After the GBR users have been allocated resource blocks for their data transmissions, the non-GBR cell edge users may be allocated resource blocks, indicated as step 52. Once these resource blocks have been allocated, the non-GBR data transmissions for non cell edge users may be allocated resource blocks in the rest of the available spectrum range, indicated as step 53.

In summary, in accordance with the present invention, the scheduling mechanism will allocate resource blocks taking into account both quality of service and the location of the user in the cell. Thus, the cell edge users are not prohibited from meeting the given quality of service as a result of the restrictions to the spectrum range and resource blocks are not wasted as a result of cell edge users being allocated resource blocks that could be used for high priority data transmissions.

Figure 6:
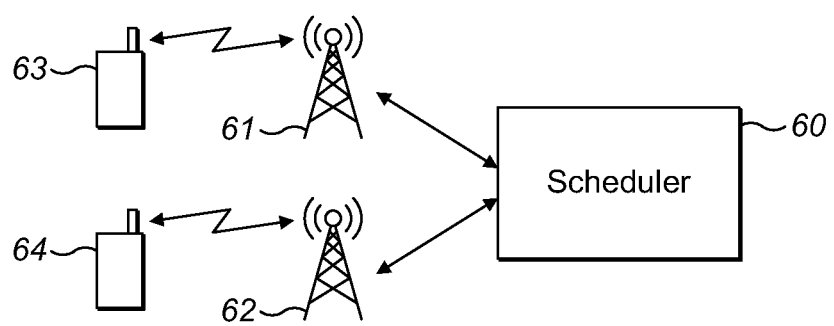

The scheduler has been described so far as being comprised within the base station. In fact, the scheduling control mechanism may be positioned in a separate network entity to the base station. This is schematically represented in FIG. 6. As shown, a scheduler 60, is positioned externally to base stations 61 and 62 and is common to both. The base stations 61 and 62 cooperate with the UEs 63 and 64, respectively, which are positioned within the cell area and are served by that cell. The common scheduler 60 receives information from the base stations in order to make a central allocation decision of the resource blocks that should be assigned for transmission to or from each UE 63 and 64.

The invention claimed is:

1. A cellular telecommunications network having a first base station corresponding to a first cell and serving a cell area, the cellular telecommunications network also having a scheduler that is instantiated at least partially by a physical computer-readable storage medium of the cellular telecommunications network, the scheduler being adapted to:
   identify a first device set comprising high priority mobile devices, at least some devices in the first set being high priority cell-edge devices, and at least some devices in the first set being high priority cell-center devices;
   identify a second device set comprising low priority mobile devices, at least some devices in the second set being low priority cell-edge devices, and at least some devices in the second set being low priority cell-center devices;
   after identifying a plurality of resource blocks that are associated with the first base station, reserve a subset of resource blocks for use by the high and low priority cell-edge devices, whereby resource blocks that are assigned to the high and low priority cell-edge devices are selected only from the subset of resource blocks;

using resource blocks selected only from the reserved subset, conduct a first assignment by assigning a resource block to each high priority cell-edge device;

after the first assignment is complete, conduct a second assignment by assigning an available resource block to each high priority cell-center device, wherein the resource blocks assigned during the second assignment are selected from the plurality of resource blocks including the reserved subset of resource blocks;

after the second assignment is complete, conduct a third assignment by assigning an unassigned resource block to each low priority cell-edge device, wherein the resource blocks assigned during the third assignment are selected only from the reserved subset; and after the third assignment is complete, conduct a fourth assignment by assigning a remaining resource block to each low priority cell-center device, wherein the resource blocks assigned during the fourth assignment are selected from the plurality of resource blocks including the reserved subset of resource blocks.

2. The cellular telecommunications network of claim 1, wherein the high and low priority cell-edge devices are devices that have associated therewith a high path loss and a low CQI.

3. The cellular telecommunications network of claim 2, wherein a notification is received from each of the high and low priority cell-edge devices, the notification including an indication of CQI, the notification also including a recommendation about which modulation and coding scheme the scheduler should allocate for each corresponding high and low priority cell-edge device, the recommendation being based on an estimate of current radio conditions.

4. The cellular telecommunications network of claim 1, wherein the high priority cell-edge and cell-center devices are devices having a guaranteed bit rate, GBR, requirement.

5. The cellular telecommunications network of claim 1, wherein all resource blocks are assigned using enhanced proportional fair scheduling.

6. The cellular telecommunications network of claim 1, wherein the scheduler also receives resource usage information that comprises a High Interference Indicator and an Overload Indicator in an uplink direction and a Relative Narrowband Transmit Power in a downlink direction.

7. A method in a cellular telecommunications network for allocating resource blocks for data transmission to or from mobile devices connected to a first base station, the first base station corresponding to a first cell and serving a cell area, the method comprising:

identifying a first device set comprising high priority mobile devices, at least some devices in the first set being high priority cell-edge devices, and at least some devices in the first set being high priority cell-center devices;

identifying a second device set comprising low priority mobile devices, at least some devices in the second set being low priority cell-edge devices, and at least some devices in the second set being low priority cell-center devices;

after identifying a plurality of resource blocks that are associated with the first base station, reserving a subset of resource blocks for use by the high and low priority cell-edge devices, whereby resource blocks that are assigned to the high and low priority cell-edge devices are selected only from the subset of resource blocks;

using resource blocks selected only from the reserved subset, conducting a first assignment by assigning a resource block to each high priority cell-edge device;

after the first assignment is complete, conducting a second assignment by assigning an available resource block to each high priority cell-center device, wherein the resource blocks assigned during the second assignment are selected from the plurality of resource blocks including the reserved subset of resource blocks;

after the second assignment is complete, conducting a third assignment by assigning an unassigned resource block to each low priority cell-edge device, wherein the resource blocks assigned during the third assignment are selected only from the reserved subset; and after the third assignment is complete, conducting a fourth assignment by assigning a remaining resource block to each low priority cell-center device, wherein the resource blocks assigned during the fourth assignment are selected from the plurality of resource blocks including the reserved subset of resource blocks.

8. The method of claim 7, wherein the high and low priority cell-edge devices are devices that have associated therewith a high path loss and a low CQI.

9. The method of claim 8, wherein a notification is received from each of the high and low priority cell-edge devices, the notification including an indication of CQI, the notification also including a recommendation about which modulation and coding scheme should be allocated for each corresponding high and low priority cell-edge device, the recommendation being based on an estimate of current radio conditions.

10. The method of claim 7, wherein the high priority cell-edge and cell-center devices are devices having a guaranteed bit rate, GBR, requirement.

11. The method of claim 7, wherein all resource blocks are assigned using enhanced proportional fair scheduling.

12. The method of claim 7, wherein a scheduler also receives resource usage information that comprises a High Interference Indicator and an Overload Indicator in an uplink direction and a Relative Narrowband Transmit Power in a downlink direction.

13. A non-transitory computer-readable storage medium having stored thereon instructions which can be executed to perform a method of:

identifying a first device set comprising high priority mobile devices associated with a first base station, at least some devices in the first set being high priority cell-edge devices, and at least some devices in the first set being high priority cell-center devices;

identifying a second device set comprising low priority mobile devices also associated with the first base station, at least some devices in the second set being low priority cell-edge devices, and at least some devices in the second set being low priority cell-center devices;

after identifying a plurality of resource blocks that are associated with the first base station, reserving a subset of resource blocks for use by the high and low priority cell-edge devices, whereby resource blocks that are assigned to the high and low priority cell-edge devices are selected only from the subset of resource blocks;

using resource blocks selected only from the reserved subset, conducting a first assignment by assigning a resource block to each high priority cell-edge device;

after the first assignment is complete, conducting a second assignment by assigning an available resource block to each high priority cell-center device, wherein the resource blocks assigned during the second assignment are selected from the plurality of resource blocks including the reserved subset of resource blocks;

after the second assignment is complete, conducting a third assignment by assigning an unassigned resource block to each low priority cell-edge device, wherein the resource blocks assigned during the third assignment are selected only from the reserved subset; and after the third assignment is complete, conducting a fourth assignment by assigning a remaining resource block to each low priority cell-center device, wherein the resource blocks assigned during the fourth assignment are selected from the plurality of resource blocks including the reserved subset of resource blocks.

14. The computer-readable storage medium of claim 13, wherein the high and low priority cell-edge devices are devices that have associated therewith a high path loss and a low CQI.

15. The computer-readable storage medium of claim 13, wherein a notification is received from each of the high and low priority cell-edge devices, the notification including an indication of CQI, the notification also including a recommendation about which modulation and coding scheme a scheduler should allocate for each corresponding high and low priority cell-edge device, the recommendation being based on an estimate of current radio conditions.

16. The computer-readable storage medium of claim 13, wherein the high priority cell-edge and cell-center devices are devices having a guaranteed bit rate, GBR, requirement.

17. The computer-readable storage medium of claim 13, wherein all resource blocks are assigned using enhanced proportional fair scheduling.

18. The computer-readable storage medium of claim 13, wherein a scheduler also receives resource usage information that comprises a High Interference Indicator and an Overload Indicator in an uplink direction and a Relative Narrowband Transmit Power in a downlink direction.

19. The computer-readable storage medium of claim 13, wherein the method further comprises:

detecting a power transmission level of a base station corresponding to a neighboring cell area; and upon a condition in which the detected power transmission level of the base station is determined to be above a certain limit, avoid assigning the resource blocks.

20. The computer-readable storage medium of claim 13, wherein the method further comprises providing a classification for both the first device set of high priority mobile devices and the second device set of low priority mobile devices.

* * * * *